United States Patent
Schneider et al.

(10) Patent No.: US 7,005,515 B2
(45) Date of Patent: Feb. 28, 2006

(54) PROCESS FOR PREPARING ALKYL HYDROXYALKYL CELLULOSE ETHERS

(75) Inventors: Hans P. Schneider, Stade (DE); Wolfgang H. Beer, Stade (DE); Stephen J. Merryweather, Wollerau (CH)

(73) Assignee: Dow Global Technologies Inc., Midland, MI (US)

( * ) Notice: Subject to any disclaimer, the term of this patent is extended or adjusted under 35 U.S.C. 154(b) by 55 days.

(21) Appl. No.: 10/468,959

(22) PCT Filed: Mar. 4, 2002

(86) PCT No.: PCT/US02/07822

§ 371 (c)(1),
(2), (4) Date: Aug. 22, 2003

(87) PCT Pub. No.: WO02/094882

PCT Pub. Date: Nov. 28, 2002

(65) Prior Publication Data

US 2004/0102625 A1    May 27, 2004

Related U.S. Application Data

(60) Provisional application No. 60/292,496, filed on May 21, 2001.

(51) Int. Cl.
*C07H 1/00* (2006.01)
*C08B 11/193* (2006.01)
*C08B 11/08* (2006.01)
*C08B 11/02* (2006.01)

(52) U.S. Cl. .......... 536/124; 536/90; 536/91; 536/95; 536/96; 536/99; 536/100

(58) Field of Classification Search ........... 536/90, 536/91, 95, 96, 99, 100, 124
See application file for complete search history.

(56) References Cited

U.S. PATENT DOCUMENTS

| 2,831,852 | A |   | 4/1958  | Savage ............... 260/231 |
|-----------|---|---|---------|-------------------------------|
| 3,355,449 | A | * | 11/1967 | Inoshita et al. ......... 536/43 |
| 3,388,082 | A | * | 6/1968  | Rodgers, Jr. et al. ..... 524/43 |
| 3,709,876 | A | * | 1/1973  | Glomski et al. ......... 536/91 |
| 4,096,325 | A | * | 6/1978  | Teng et al. ............ 536/91 |
| 4,550,161 | A |   | 10/1985 | Felcht et al. ........... 536/90 |
| 4,650,863 | A |   | 3/1987  | Felcht et al. ........... 536/90 |

FOREIGN PATENT DOCUMENTS

| DE | 15 68 423 | 3/1970  |
| DE | 33 16 124 | 11/1984 |
| EP | 0 456 101 | 11/1991 |
| FR | 2 215 427 | 8/1974  |
| GB | 1 003 662 | 9/1965  |

\* cited by examiner

*Primary Examiner*—James O. Wilson
*Assistant Examiner*—Everett White

(57) ABSTRACT

The process for preparing an alkyl hydroxyalkyl cellulose ether comprises the steps of: a) alkalizing cellulose to obtain alkali cellulose, b) reacting alkali cellulose with an alkyl halogenide until an alkyl cellulose ether with a D.S.(alkyl) value of from 0.7 to 2.5. is attained, c) removing excess alkyl halogenide from the reaction mixture, and d) reacting the alkyl cellulose ether with an alkylene oxide in a liquid suspending agent to produce an alkyl hydroxyalkyl cellulose ether. An alkyl hydroxyalkyl cellulose ether is produced which has an D.S.(alkyl) of from 0.7 to 2.5 and an MS (hydroxyalkyl) from 0.03 to 2.0, wherein not more that 15 percent of the hydroxyalkyl groups are capped with an alkyl group.

10 Claims, No Drawings

PROCESS FOR PREPARING ALKYL HYDROXYALKYL CELLULOSE ETHERS

This application claims the benefit of Provisional Application No. 60/292,496, filed May 21, 2001.

The present invention relates to new alkyl hydroxyalkyl cellulose ethers and a process for preparing them.

BACKGROUND OF THE INVENTION

Alkyl hydroxyalkyl cellulose ethers and processes for preparing them are generally known in the art. The alkyl hydroxyalkyl cellulose ethers find use in a large variety of technology areas including the building, pharmaceutical and food industry and in a wide range of applications, for example in pharmaceutical capsules and tablets, or as suspending agents in vinyl chloride polymerization. Depending on the type of end-use, the alkyl hydroxyalkyl cellulose ethers vary in molecular weight, type or degree of alkyl and hydroxyalkyl groups present in the cellulose ether or combinations thereof.

A commonly known process for preparing alkyl hydroxyalkyl cellulose ethers includes the steps of alkalizing cellulose and etherification of the alkali cellulose with an alkylene oxide and an alkyl halogenide. The etherification with an alkylene oxide requires the presence of a catalytic, that means sub-stoichiometric, amount of a base, whereas the etherification with an alkyl halogenide consumes a stoichiometric amount of a base.

GB-A-1,003,662 discloses a process for preparing alkyl hydroxyalkyl cellulose ethers wherein cellulose is pre-treated with an alkali halide in the presence of alkali and water until a D.S. value of 0.05 to 0.5 is attained, the amount of alkali contained in the pre-treated cellulose is reduced to less than 10 percent, based on the pre-treated cellulose and the pretreated cellulose is contacted with a gaseous alkylene oxide in the presence of the reduced amount of alkali until an M.S. value of more than 1.0 is attained. Pre-treatment can be conducted in the liquid phase, but that it is more conveniently conducted in the gaseous phase. GB-A-1,003,662 teaches that the reaction of the pre-treated cellulose ether with the alkylene oxide can be conducted in a methanol-acetone mixture, but for achieving an M.S. of more than 1 and a good solubility of the resulting cellulose ether, the pre-treated cellulose ether should be reacted with gaseous alkylene oxide. Unfortunately, the produced cellulose ethers are hot-water-soluble or thermoplastic and thus are not very useful for many important applications. Furthermore, as taught in GB-A-1, 003,662, the pre-treated cellulose should be contacted with a gaseous alkylene oxide for etherification. If the etherification with propylene oxide is carried out in liquid phase in the presence of a mixture of methanol and acetone, as disclosed in the comparative process in Example 1, propylene oxide will react with methanol to produce, for example, methoxypropanol or 1,2-dimethoxypropan as undesirable by-products. Moreover, any further purification, which is necessary for many applications, of the thermoplastic or hot-water-soluble cellulose ether produced in liquid phase by washing with hot water presents major difficulties. Moreover, the produced alkyl hydroxyalkyl cellulose ethers with a D.S. value of only from 0.05 to 0.5 are not useful for many applications in the building and other industries.

German Offenlegungsschrift DE-A-33 16 124 (corresponding to U.S. Pat. No. 4,550,161) teaches that the process disclosed in GB-A-1,003,662 has substantial disadvantages. It teaches that the absence of liquid dispersants leads to inhomogeneously etherified products and that the cellulose which has been pre-treated with an alkali halide has to be purified prior to the reaction with an alkylene oxide because of the high content of residual alkali. To overcome these disadvantages, German Offenlegungsschrift DE-A-33 16 124 discloses a process with the following steps: (a) alkalizing the cellulose ether, (b) etherifying the alkali cellulose with ethylene oxide or propylene oxide in the presence of a sub-stoichiometric quantity of a base, (c) increasing the quantity of the base and (d) etherifying the cellulose ether with methyl chloride. In all steps water is present. In at least one step dimethoxyethane, an alkanol, an alkane diol and/or an alkoxyalkanol is used as a dispersing auxiliary.

In U.S. Pat. No. 4,650,863 a similar process is disclosed except that the dispersing auxiliary is dimethyl ether, which is used either alone or in mixture with dimethoxyethane, an alkanol, an alkane diol and/or an alkoxyalkanol.

Unfortunately, in the processes taught in U.S. Pat. Nos. 4,550,161 and 4,650,863 the starting cellulose pulp is insufficiently activated by the low quantity of the used caustic leaving too many crystalline areas of the cellulose fibers intact.

In other known, commonly used processes the etherification of the alkali cellulose with an alkylene oxide and an alkyl halogenide are conducted simultaneously.

According to the procedure described in U.S. Pat. Nos. 4,550,161 and 4,650,863 the free hydroxy groups of the anhydroglucose units in the cellulose react with an alkylene oxide, which means that they are etherified with hydroxyalkyl groups. The hydroxyalkyl substituents again contain a free hydroxy group. Therefore, there are different kinds of free hydroxy groups available after hydroxyalkylation. There are free hydroxy groups in the anhydroglucose and in the hydroxyalkyl groups as well. Depending on the employed amount of alkyl halogenide for the alkylation, both kinds of the free hydroxy groups are etherified with alkyl groups. In case of the etherification of the hydroxyalkyl groups the common term is capping. It is difficult or very circumstantial to control which hydroxy groups are capped with alkyl groups.

In view of the deficiencies of the prior art processes, it would still be desirable to provide a new process for producing alkyl hydroxyalkyl cellulose ethers. For enriching the art, it would particularly be desirable to provide new alkyl hydroxyalkyl cellulose ethers.

SUMMARY OF THE INVENTION

One aspect of the present invention is a process for preparing an alkyl hydroxyalkyl cellulose ether which comprises the steps of:
a) alkalizing cellulose to obtain alkali cellulose,
b) reacting alkali cellulose with an alkyl halogenide until an alkyl cellulose ether with a D.S.(alkyl) value of from 0.7 to 2.5 is attained,
c) removing excess alkyl halogenide from the reaction mixture, and
d) reacting the alkyl cellulose ether with an alkylene oxide in a liquid suspending agent to produce an alkyl hydroxyalkyl cellulose ether.

Another aspect of the present invention is an alkyl hydroxyalkyl cellulose ether having a D.S.(alkyl) of from 0.7 to 2.5 and an M.S. (hydroxyalkyl) of from 0.03 to 2.0, wherein not more than 15 percent of the hydroxyalkyl groups are capped with an alkyl group.

DETAILED DESCRIPTION OF THE INVENTION

Preferably, all reaction steps in the process described below are carried out while the reaction mixture is agitated. The reaction steps can be conducted using one or several of the apparatuses known from cellulose ether chemistry, for example kneaders, agitated vessels, agitated reactor-mixers, or screw mixers. The reaction mixtures and reaction apparatuses may be rinsed with an inert gas, such as nitrogen, to remove oxygen.

Reaction step a) can be carried out in a known manner. Generally finely divided, preferably ground, cellulose is mixed with water and an alkali metal hydroxide, preferably sodium hydroxide. The cellulose employed is either of natural origin, for example cotton linters or wood pulp, or it is in a regenerated form, such as cellulose hydrate. The average particle size of the cellulose is preferably less than 2.5 mm, more preferably less than 1 mm, most preferably less than 0,5 mm. The alkali metal hydroxide can be used in a solid form or in the form of an aqueous solution. When an aqueous solution is used, its alkali metal hydroxide concentration generally is from 15 to 70 percent, preferably from 25 to 60 percent, most preferably from 45 to 55 percent, based on the total weight of the aqueous solution. Generally the molar ratio between the alkali metal hydroxide and the cellulose in the alkalization step, calculated on the basis of an anhydro-D-glucose unit, is from 0.5 to 10:1, preferably from 1.0 to 6.0:1. The alkalization reaction can be carried out in the presence of a liquid suspending agent as described for the reaction step b) below. Preferably, the weight ratio between the liquid suspending agent and the cellulose is from 0.1 to 10.0:1, more preferably from 0.2 to 5.0:1. Preferably the weight ratio between the water and the liquid suspending agent, if both are present, is from 0.15 to 2.5:1, more preferably from 0.3 to 1.25:1. The reaction between the cellulose and the alkali metal hydroxide is generally carried out at a temperature of from 10 to 50° C., preferably from 20 to 45° C., and at a pressure of from 10 to 1,000 kPa, preferably from 100 to 800 kPa.

In the reaction step b) the alkali cellulose is reacted with an alkyl halogenide until an alkyl cellulose ether with a D.S. (alkyl) value of from about 0.7 to about 2.5, preferably from about 0.8 to about 2.2, more preferably from about 0.9 to about 2.0 is attained. The preparation of the alkali cellulose and the reaction of the alkali cellulose with the alkyl halogenide can be carried out in the same reactor or in two separate reactors. The alkyl halogenide is optionally added to the cellulose before or as early as the alkali metal hydroxide, but preferably it is added after at least a part of the cellulose has reacted to alkali cellulose. Useful alkyl halogenides generally contain from 1 to 4 carbon atoms, preferably from 1 to 3 carbon atoms, more preferably 1 or 2 carbon atoms. Bromides and particularly chlorides are preferred. Ethyl chloride and particularly methyl chloride are the most preferred alkyl halogenides. Generally the molar ratio between the alkyl halogenide and the cellulose, calculated on the basis of an anhydro-D-glucose unit, is from 0.1 to 15.0:1, preferably from 1.0 to 10.0:1. Generally step b) is carried out in the presence of an alkali metal hydroxide such that the molar ratio between the alkali metal hydroxide and the cellulose, calculated on the basis of an anhydro-D-glucose unit, is from 0.3 to 6.5:1, preferably from 1.0 to 5.0:1. Preferably, step b) is carried out in the presence of a liquid suspending agent, such as water or an organic solvent, preferably an straight-chain or cyclic ether, such as dimethyl ether, ethylene glycol monoalkyl ether, ethylene glycol dialkyl ether, dioxane or tetrahydrofurane; a $C_1$–$C_6$ alkanol, such as isopropanol, or tert.-butanol; a $C_1$–$C_4$-alkoxy-($C_1$–$C_6$)-alkanol, or an aromatic or aliphatic hydrocarbon, such as toluene, xylene, hexane or heptane. Preferably the weight ratio between the liquid suspending agent and the cellulose is from 0.1 to 15.0:1, more preferably from 0.2 to 10.0:1. Step b) is generally carried out at a temperature of from 25 to 120° C., preferably from 40 to 110° C. and a pressure of from 5 to 25 bar (500 to 2500 kPa), preferably from 10 to 20 bar (1000 to 2000 kPa). The reaction is generally complete within 30 to 480 minutes.

In step c) of the process of the present invention excess alkyl halogenide is removed from the reaction mixture. By the term "excess alkyl halogenide is removed" is meant that substantially all alkyl halogenide that has not reacted with alkali cellulose in step b) is removed from the product mixture in step c). Such removal can be carried out in a generally known way, such as filtration, centrifugation, distillation, or evaporation at reduced pressure. Alkyl halogenide should be removed to such an extent that substantially no alkyl halogenide is left in the reaction mixture that is able to react in the subsequent reaction step d). In this reaction mixture the molar ratio between the alkyl halogenide and the cellulose used in step a), calculated on the basis of an anhydro-D-glucose unit, is generally less than 0.007:1, preferably less than 0.002:1, most preferably less than 0.001:1.

After removal of the alkyl halogenide, the alkylated cellulose can be reacted with an alkylene oxide in the subsequent step d) without temporary interruption of the process or without isolation of the alkylated cellulose. Alternatively, the reaction may be temporarily interrupted and proceeded at a later stage. In the latter case the alkylated cellulose can be isolated in a known way. Advantageously, the reaction mass is suspended in hot water. Preferably, excess alkali metal hydroxide is removed prior to step d) in a known way. Removal of excess alkali metal hydroxide can partially be achieved by use of aqueous washing liquor. Preferably, a neutralizing agent, such as a mineral acid, carbonic acid or acid anhydride, for example nitric acid, hydrochloric acid, acetic acid, citric acid, or carbon dioxide is added to the washing liquor to neutralize excess alkali metal hydroxide. Most preferably, acetic acid is used for the neutralization. The alkyl cellulose ether can be removed from the reaction mixture and washed in a known manner, for example by filtration or centrifugation. A part or substantially all of the alkali metal halide that has been produced as a by-product in step b) may be removed during this washing procedure. Optionally, the alkyl cellulose ether can be dried and comminuted in a known manner. Drying is for example carried out by a plate dryer, a fluid bed dryer, or a milling/drying device. Comminution can be carried out in a known mill to a particle size of preferably less than 0.5 mm, more preferably less than 0.3 mm.

In step d) of the process of the present invention the alkyl cellulose ether produced in step c) is reacted with an alkylene oxide in a liquid suspending agent to produce an alkyl hydroxyalkyl cellulose ether. Step d) can be carried out in the same reactor as steps a) and b). Preferably, step d) is carried out in a different reactor than steps a) and b). If excess alkali metal hydroxide has been removed in the process step c), a base is added to the alkyl cellulose ether obtained in step c). A catalytic amount of the base is sufficient. The base is preferably an alkali metal hydroxide, more preferably sodium hydroxide, but other bases, such as quaternary ammonium bases, are also useful. The alkali metal hydroxide can be used in a solid form or in the form of an aqueous solution. When an aqueous solution is used, its alkali metal hydroxide concentration generally is from 15 to 70 percent, preferably from 45 to 55 percent, based on the total weight of the aqueous solution. Generally the molar ratio between the alkali metal hydroxide and the cellulose used in step a), calculated on the basis of an anhydro-D-glucose unit, is from 0.1 to 1.5:1, preferably from 0.1 to 1.0:1. Preferred alkylene oxides contain from 2 to 4 carbon atoms. Particularly preferred is ethylene oxide or, most preferred, propylene oxide. Generally the molar ratio between the alkylene oxide and the cellulose used in step a), calculated on the basis of an anhydro-D-glucose unit, is from 0.05 to 20:1, preferably from 0.1 to 10:1.

Step d) is carried out in the presence of a liquid suspending agent, generally an organic solvent which is optionally mixed with water. A useful organic solvent is for example an straight-chain or cyclic ether, such as dimethyl ether, ethylene glycol monoalkyl ether, ethylene glycol diethyl ether, dioxane or tetrahydrofurane; a $C_1$–$C_6$ alkanol, such as isopropanol or tert.-butanol; a $C_1$–$C_4$-alkoxy-($C_1$–$C_6$)-alkanol, or an aromatic or aliphatic hydrocarbon, such as toluene, xylene, hexane or heptane. Blends of organic solvents are also useful. It has been surprisingly found that the choice of the liquid suspending agent has a great influence on the swelling of the produced alkyl hydroxyalkyl cellulose ether in the reaction mixture. By proper selection of the suspending agent, the swelling of the alkyl hydroxyalkyl cellulose ether can be reduced, the suspending agent can be easily removed from the alkyl hydroxyalkyl cellulose ether and the purification of the alkyl hydroxyalkyl cellulose ether is substantially facilitated. It has been found that the hydroxyalkylation reaction is facilitated and swelling of the produced alkyl hydroxyalkyl cellulose ether can be minimized if the liquid suspending agent used in step d) is a solvent or solvent mixture which has the following properties i) unpolar character, ii) polar character, and iii) the capability for the formation of H-bonds, preferably in a well balanced manner. These properties can be provided by the employment of three different solvents in a mixture wherein each of them contributes one of the desired properties, for example heptane providing unpolar character, acetone providing polar character, and water providing the capability to form H-bonds. These balanced properties can also be achieved by two solvents in a mixture, for example hexane providing the unpolar character, and 2-propanol providing the polar and H-bond character. These balanced properties can also be reached in a single solvent providing all three properties, such as 2-ethyl-hexanol.

The reaction in step d) is preferable carried out in an alcohol or in a solvent mixture comprising i) an aromatic or aliphatic hydrocarbon, such as toluene, hexane or heptane, and ii) an alcohol, such as a $C_1$–$C_6$ alkanol, for example isopropanol, or tert.-butanol or a $C_1$–$C_4$-alkoxy-($C_1$–$C_6$)-alkanol, such as methoxy-propanol. The alcohol is preferably tert-butanol or isopropanol. More preferably, reaction step d) is carried out in isopropanol or, most preferably, in a blend of isopropanol and n-hexane. A blend preferably comprises i) from 10 to 90, more preferably from 20 to 80, most preferably from 40 to 60 weight percent of an alcohol, such as isopropanol, and from 90 to 10, more preferably from 80 to 20, most preferably from 60 to 40 weight percent of an aromatic or aliphatic hydrocarbon, such as n-hexane.

It has surprisingly been found that the hydroxyalkylation reaction is facilitated and swelling of the produced alkyl hydroxyalkyl cellulose ether can be minimized if the liquid suspending agent used in step d) is a solvent or solvent mixture which has a total solubility parameter $\delta_T$ of from 10 to 28 $MPa^{1/2}$, preferably from 1 to 26 $MPa^{1/2}$, most preferably from 15 to 24 $MPa^{1/2}$.

The total solubility parameter is defined by the following equation (I)

$$\delta_T = (\delta_D^2 + \delta_P^2 + \delta_H^2)^{1/2} \, MPa^{1/2} \tag{I}$$

wherein $\delta_D$ is the partial solubility parameter for non-polar interaction, $\delta_P$ is the partial solubility parameter for polar interaction, and $\delta_H$ is the partial solubility parameter for hydrogen bonding.

$\delta_D$, $\delta_P$, $\delta_H$ and $\delta_T$ are known as Hansen solubility parameters, see C. M. Hansen, Ind. Eng. Prod. Res. Develop. 8, 1, 2–11 (1969) and C. M. Hansen, Hansen solubility parameters, CRC Press, Boca Raton, Fla. (1999). Both the partial solubility parameters $\delta_D$, $\delta_P$, and $\delta_H$ and the total solubility parameters $\delta_T$ are listed in the literature for a great number of solvents, see A. F. M. Barton, Handbook of solubility parameters and other cohesion parameters, CRC Press Inc, Boca Raton, Fla. (1991).

The determination of solubility parameters of polymers including cellulose ethers, such as hydroxypropyl methyl cellulose ethers and hydroxyethyl methyl cellulose ethers is known, see W. L. Archer, Ind. Eng. Chem. Res. 30, 2292–8 (1991). Cellulose ethers with alkyl and/or hydroxyalkyl groups typically exhibit a total solubility parameter $\delta_T$ of from 20 to 31 $MPa^{1/2}$. Water-soluble cellulose ethers, such as hydroxyethyl cellulose ethers, hydroxyethyl methyl cellulose ethers or hydroxypropyl methyl cellulose ethers, generally have a $\delta_T$ of from 28 to 31 $MPa^{1/2}$, see W. L. Archer, Drug Dev. Ind. Pharm. 18, 599–616(1992). Water has a $\delta_T$ of 31.7 $Mpa^{1/2}$.

Surprisingly, it has also been found that the hydroxyalkylation reaction is facilitated and swelling of the produced alkyl hydroxyalkyl cellulose ether can be minimized if step d) is carried out in a suspending agent such that the radius of interaction $^{ij}R$ is at least 6.0 $MPa^{1/2}$, preferably at least 8.0 $MPa^{1/2}$, and most preferably at least 10.0 $MPa^{1/2}$. Preferably, $^{ij}R$ is not more than 35 $MPa^{1/2}$, more preferably not more than 30 $MPa^{1/2}$, most preferably not more than 25 $MPa^{1/2}$. $^{ij}R$ is calculated based on the total solubility parameter $\delta_T$ of the alkyl hydroxyalkyl cellulose ether to be prepared and $\delta_T$ of the suspending agent according to the following equation II:

$$^{ij}R = (4(^i\delta_D - ^j\delta_D)^2 + (^i\delta_P - ^j\delta_P)^2 + (^i\delta_H - ^j\delta_H)^2)^{1/2} \tag{II}$$

In this equation, the "j" terms correspond to the parameters of the solute, that means the cellulose ether, and the "i" terms to the parameters of the solvent, that means of the suspending agent.

Solubility parameters of solvent mixtures can be calculated from the following equation III, where $\Phi$ is the volume fraction of a component in mixture, this means that $\Phi_1$, $\Phi_2$, etc. is the volume fraction of the first, second, etc. component of the mixture. $\delta_{T1}$, $\delta_{T2}$, etc. is the total solubility parameter of the first, second, etc. component of the mixture.

$$\delta_T(\text{mixture}) = \Phi_1 \delta_{T1} + \Phi_2 \delta_{T2} + \tag{III}$$

Preferably the weight ratio between the alkyl cellulose ether and the liquid suspending agent is from 0.1 to 30:1, more preferably from 1 to 20:1, most preferably from 2 to 15:1. Preferably the weight ratio between the alkylene oxide and the liquid suspending agent is from 0.001 to 1:1, more preferably from 0.01 to 1:1, most preferably from 0.01 to 0.5:1. Step d) is generally carried out at a temperature of from 50 to 110° C., preferably from 70 to 100° C. The pressure in reaction step d) generally is from 1 to 12 bar (100 to 1200 kPa), preferably from 1 to 10 bar (100 to 1000 kPa), more preferably from 1 to 7 bar (100 to 700 kPa). If an inert gas is used in the reaction step d), the pressure may be higher. If steps b) and d) are carried out in separate reactors, the pressure rating in the reactor for step d) can be lower than in reaction step b), which is an advantage of the process of the present invention. The alkylene oxide is generally reacted with the alkyl cellulose ether until an alkyl hydroxyalkyl cellulose ether with an M.S. (hydroxyalkyl) value of at least about 0.03, preferably at least about 0.05, more preferably at least about 0.08 and up to about 2.0, preferably up to about 1.5, more preferably up to about 1.2 is attained. The reaction is generally complete within 30 to 480 minutes, preferably within 60 to 360 minutes.

The resulting product mixture can be processed in a known manner. Preferably, an above-mentioned acid is added to the product mixture to neutralize the base which is generally present in the mixture. The alkyl hydroxyalkyl cellulose ether can be freed from the bulk of liquid components in a separating device, such as a filter or a centrifuge. The separated alkyl hydroxyalkyl cellulose ether is then preferably washed 1 to 5 times with a washing liquor, preferably with the solvent or solvent mixture used in step d). Alkali metal halide that has been produced as a byproduct in step b) or d) during neutralization can be removed during an additional washing step with hot water, which is a known procedure in the preparation of cellulose ethers. The alkyl hydroxyalkyl cellulose ether can be dried, comminuted and sieved in a known manner. Drying is for example carried out by a plate dryer, tube dryer, fluid bed dryer, milling/drying step, or other known technology. Comminution can be carried out in a known mill to an average particle size of preferably less than 1 mm, more preferably less than 0.5 mm.

The process of the present invention wherein alkali cellulose is reacted with an alkyl halogenide, non-reacted alkyl halogenide is removed from the reaction mixture, and the alkyl cellulose ether is reacted with an alkylene oxide has numerous advantages. The formation of by-products can be well controlled in type and quantity. Furthermore, the by-products can be easier used for recycling or are better degradable in treatment facilities for environmental protection than by-products from known processes wherein the etherifications of the cellulose with an alkyl halogenide and an alkylene oxide are not strictly separated. For example, in the reaction step b) generally only an alkanol and a dialkyl ether are produced as by-products in addition to the alkyl cellulose ether and the alkali metal halide. In the case of methylation of the alkali cellulose, only methanol and dimethyl ether are produced as by-products, which can be easily stripped from water that is present in the reaction or from the washing agent in step b). In step d) of the reaction only the alkylene oxide can form by-products. Glycols are the most common by-products, which are easily biodegradable in wastewater treatment facilities. In contrast to known processes wherein an alkyl halogenide and an alkylene oxide are present in the same reaction mixture, no alkylated glycols are formed as by-products. In the mentioned known processes alkylated glycols are formed which are much more difficult to treat by biodegradation than glycols. Moreover, the separation of the alkylation step b) and the hydroxyalkylation step d) allows a lower pressure in the hydroxyalkylation step.

According to the above-described process novel alkyl hydroxyalkyl cellulose ethers are produced which have a D.S.(alkyl) of from about 0.7 to about 2.5, preferably from about 0.8 to about 2.2, more preferably from about 1.0 to about 2.0 and an M.S. (hydroxyalkyl) of from about 0.03 to about 2.0, preferably from about 0.05 to about 1.5, more preferably from about 0.08 to about 1.2, and wherein not more than about 15 percent, preferably not more than about 10 percent, more preferably not more than about 5 percent of the hydroxyalkyl groups are capped with an alkyl group. Essentially only hydroxy groups in the anhydroglucose units are alkylated by means of an alkyl halogenide. The "D.S." is the degree of substitution, that means the average number of substituted hydroxy groups per anhydro-D-glucose unit; in the case of cellulose it can be within the range from 0.0 to 3.0. The D.S. (alkyl) designates the degree of substitution with alkoxy groups. The "M.S." is the molar degree of substitution, that means the average number of moles of the substituting reagent which have been attached by an ether linkage per mole of anhydro-D-glucose unit; in the case of cellulose it can be even greater than 3.0; it is normally used in order to characterize those substituents on the cellulose ether molecule which can be formed by multiple substitution at an OH group, for example in the case of the hydroxyalkyl substituent because the resulting OH groups of the hydroxyalkyl groups can also be substituted, like the OH groups of the cellulose itself. The M.S. (hydroxyalkyl) designates the average number of moles of hydroxyalkoxy groups which have been attached by an ether linkage per mole of anhydro-D-glucose unit. The novel alkyl hydroxyalkyl cellulose ethers generally have a viscosity of from 3 to 1,000,000 mPa·s (millipascal-seconds), preferably from 3 to 500,000 mPa·s, more preferably from 40 to 250,000 mPa·s, measured as a 2 weight percent aqueous solution using an UBBELOHDE viscosimeter at 20° C.

The present invention is further illustrated by the following examples which should not be construed to limit the scope of the present invention. All parts and percentages are by weight unless otherwise indicated. The alkyl and hydroxyalkyl substitutions indicated in the examples below are measured and calculated according to ASTM D3876. The viscosities indicated in the examples below are measured and normalized to a 2 weight percent aqueous solution using an UBBELOHDE viscosimeter at 20° C.

EXAMPLE 1

Ai) Methoxylation 300 g of ground cellulose pulp are charged to a 10 L horizontal steel reactor. The air is carefully replaced by nitrogen. 150 g of dimethyl ether are added. Then 600 g of 50% aqueous caustic are added for the activation of the cellulose. After 20 minutes of alkalization at a temperature of 40° C. and a pressure of 5 bar (500 kPa), 380 g of chloromethane are feed into the reactor under agitation. The temperature is raised to 80° C. and kept at this level for 5 hours. The pressure ranges from 17.5 to 12 bar (1750–1200 kPa). Then the reactor pressure is reduced to normal pressure. The content of the reactor is slurried up with 4 L of hot water, neutralized with acetic acid, filtered and washed with additional 4 L of hot water. After drying and milling a methyl cellulose ether is obtained which has a methoxyl substitution (MeO) of 21.4 percent, which corresponds to a DS(methyl) of 1.24.

Aii) Hydroxypropoxylation 300 g of the methyl cellulose ether produced in the methylation step Ai) are charged to a horizontal steel reactor and the air is carefully replaced by nitrogen. The material is then suspended in 3000 g of a nitrogen-purged mixture of 87 percent of isopropanol and 13 percent of water and padded with nitrogen. 30 g of 50% aqueous caustic are added to the suspension for the activation of the residual hydroxy groups of the methyl cellulose ether. After 30 min. of alkalization at a temperature of 25° C. and a pressure of 2.5 bar (250 kPa), 90 g of propylene oxide are charged to the reactor. The temperature is raised to 75° C. and kept at this level for 150 minutes at a pressure of 3.7 bar (370 kPa). Then the reactor pressure is reduced to a pressure of 1.5 bar (150 kPa) and the reactor temperature is kept at 75° C. Then acetic acid is added for the neutralization of the caustic. The whole reactor content is dumped into a steel pressure filter in order to remove the liquid. Since the formed cellulose ether exhibits a significant swelling in the isopropanol/water mixture, filtration is cumbersome. The cellulose ether is treated with several charges of 3 L of acetone in order to displace the soaked isopropanol/water. The dried cellulose ether is of excellent colour and marginal salt content. The produced hydroxypropyl methyl cellulose ether has a methoxyl substitution (MeO) of 19.5 percent, which corresponds to a DS(methyl) of 1.19, and a hydroxypropoxyl (HpO) substitution of 7.4 percent, which corresponds to an MS (hydroxypropyl) of 0.19. The methyl hydroxypropyl cellulose ether has a viscosity of 2,000 mPa·s.

Bi) Methoxylation

In a reaction similar to example Ai) 300 g of ground cellulose pulp are reacted with 640 g of 50% aqueous caustic and 720 g of chloromethane for 5 hours. A methyl cellulose ether is obtained with 30.2 percent MeO (DS=1.83).

Bii) Hydroxypropoxylation

The methyl cellulose ether is reacted to the hydroxypropyl methyl cellulose ether in the subsequent reaction step similar to example Aii). 300 g of the methyl cellulose ether is suspended in 3000 g of a nitrogen purged mixture of 87 percent of isopropanol and 13 percent of water and padded with nitrogen. Then 30 g of 50% aqueous caustic and 90 g of propylene oxide are added. After the cumbersome filtration, washing and drying as in example Aii), the produced methyl hydroxypropyl cellulose ether has 28.8 percent MeO (DS=1.81), 5.3 percent HpO (MS=0.14) and a viscosity of 10,000 mPa·s.

EXAMPLE 2

Ai) Methoxylation 300 g of ground cellulose pulp are charged to a 10 L horizontal steel reactor. The air is carefully replaced by nitrogen and 150 g of dimethylether are added. Then 600 g of 50% aqueous caustic are added for the activation of the cellulose. After 20 minutes of alkalization at a temperature of 40° C. and at a pressure of 5 bar (500 kPa), 500 g of chloromethane are feed into the reactor under agitation. The temperature is raised to 80° C. and kept at this level for 5 hours. The pressure ranges from 17.5 to 12 bar (1750–1200 kPa). Then the reactor pressure is reduced to normal pressure. The content of the reactor is slurried up with 4 L of hot water, neutralized with acetic acid, filtered and washed with additional 4 L of hot water. After drying and milling a methyl cellulose ether is obtained which has a methoxyl substitution (MeO) of 25.0 percent, which corresponds to a DS (methyl) of 1.47.

Aii) Hydroxypropoxylation 300 g of the resulting methyl cellulose ether from example 2Ai) are suspended in 2300 g of pure isopropanol purged with nitrogen in a horizontal steel reactor and padded with nitrogen. After the activation of the starting material with 30 g of 50% aqueous caustic during 15 minutes at a temperature of 40° C. and a pressure of 2.5 bar (250 kPa), 90 g of propylene oxide are charged to the suspension. Thereafter the reactor temperature is raised to 80° C. and kept at this temperature for 3.5 hours at a pressure of 3.7 bar (370 kPa). Then the reactor pressure is reduced to a pressure of 1.5 bar (150 kPa) and the reactor temperature is kept at 75° C. The reactor content is neutralized with acetic acid. The reactor content is dumped into a steel pressure filter and the superficial solvent is removed from the product. The resulting hydroxypropyl methyl cellulose ether is still in a swollen form containing residual isopropanol and some water. The swelling is not as severe as in Example 1 but treatment of the product with a non-swelling organic liquid is still advisable. Thus the swollen product is treated several times with charges of 3 L acetone in order to remove isopropanol/water. The dried hydroxypropyl methyl cellulose ether is of excellent color and a negligible salt content. The produced hydroxypropyl methyl cellulose ether has 22.9 percent MeO (DS=1.39), 4.6 percent HpO (MS=0.12) and a viscosity of 1,400 mPa·s.

Bi) Methoxylation

The first step of the reaction is conducted according to example 1Bi).

Bii) Hydroxyporopoxylation

In the subsequent reaction step similar to example 2Aii) the methyl cellulose ether is converted into the hydroxypropyl methyl cellulose ether. Thus 300 g of the methyl cellulose ether is suspended in 2300 g of pure isopropanol and reacted with 30 g of 50% aqueous caustic and 90 g of propylene oxide. As in Example 2Aii) swelling is significant. Thus the swollen product is treated several times as described in Example 2Aii). The washed and dried hydroxypropyl methyl cellulose ether exhibits 28.8 percent MeO (DS=1.81), 5.3 percent HpO (MS=0.14) and a viscosity of 1,300 mPa·s. The product is of white colour with negligible salt content.

EXAMPLE 3

Ai) Methoxylation 300 g of ground cellulose pulp are charged to a 10 L horizontal steel reactor. The air is carefully replaced by nitrogen and 200 g of dimethyl ether are added. Then 600 g of 50% aqueous caustic are added for the activation of the cellulose. After 20 min. of alkalization at a temperature of 40° C. and a pressure of 5 bar (500 kPa), 500 g of chloromethane are feed into the reactor under agitation. The temperature is raised to 80° C. and kept at this level for 5 hours. The pressure ranges from 17.5 to 12 bar (1750–1200 kPa). Then the reactor pressure is reduced to normal pressure. The content of the reactor is slurried up with 4 L of hot water, neutralized with acetic acid, filtered and washed with additional 4 L of hot water. After drying and milling a methyl cellulose ether is obtained which has a methoxyl substitution (MeO) of 24.3 percent, which corresponds to a DS (methyl) of 1.43.

Aii) Hydroxypropoxylation 300 g of the methyl cellulose ether from example 3Ai) are charged into a horizontal steel reactor and suspended in 4000 g of a nitrogen purged mixture of 50 percent of isopropanol and 50 percent of n-hexane and padded with nitrogen. The suspension is treated with 60 g of 50% aqueous caustic for the activation of the starting material during 20 minutes at a temperature of 34° C. and a pressure of 3.5 bar (350 kPa). Then 50 g of propylene oxide are added and the reactor is kept at 85° C. for 4.5 hours at a pressure of 5.25 bar (525 kPa). Then the reactor pressure is reduced to a pressure of 1.5 bar (150 kPa) and the reactor temperature is kept at 75° C. The reactor content is neutralized with acetic acid and transferred into a steel pressure filter in order to remove the solvent. The product exhibits marginal swelling. Residual by-products can be washed out with small quantities of fresh solvent mixture used for the reaction. The product is of white color with a negligible salt content. After drying and milling, the hydroxypropyl methyl cellulose ether has 22.0 percent MeO (DS=1.35), 6.8 percent HpO (MS=0.17) and a viscosity of 1,600 mPa·s.

Bi) Methoxylation 300 g of ground cellulose pulp are charged to a 10 L horizontal steel reactor. The air is carefully replaced by nitrogen and 200 g of dimethyl ether are added. Then 650 g of 50% aqueous caustic are added for the activation of the cellulose. After 20 minutes of alkalization at a temperature of 40° C. and at a pressure of 5 bar (500 kPa), 750 g of chloromethane are fed into the reactor under agitation. The temperature is raised to 80° C. and kept at this level for 5 hours. The pressure ranges from 17.5 to 12 bar (1750–1200 kPa). Then the reactor pressure is reduced to normal pressure. The content of the reactor is slurried up with 4 L of hot water, neutralized with acetic acid, filtered and washed with additional 4 L of hot water. After drying and milling a methyl cellulose ether is obtained which has a methoxyl substitution (MeO) of 30.2 percent, which corresponds to a DS(methyl) of 1.83.

Bii) Hydroxypropoxylation 300 g of the methyl cellulose ether from example 3Bi) are charged into a horizontal steel reactor and suspended in 3900 g of a nitrogen purged mixture of 50 percent of isopropanol and 0.50 percent of n-hexane and padded with nitrogen. The suspension is treated with 60 g of 50% aqueous caustic for the activation of the starting material during 20 minutes at a temperature of 34° C. and a pressure of 3 bar (300 kPa). Then 90 g of propylene oxide are added and the reactor is kept at 85° C. for 4.5 hours at a pressure of 4.2 bar (420 kPa). Then the reactor pressure is reduced to a pressure of 1.5 bar (150 kPa) and the reactor temperature is kept at 75° C. The reactor content is neutralized with acetic acid and transferred into a steel pressure filter in order to remove the solvent. The product exhibits marginal swelling. Residual by-products can be washed out with small quantities of fresh solvent mixture used for the reaction. After drying and milling, the hydroxypropyl methyl cellulose has 28.6 percent MeO, (DS=1.79), 4.8 percent HpO (MS=0.12) and a viscosity of 42,000 mPa·s. The product is of white color with negligible salt content.

The invention claimed is:

1. A process for preparing an alkyl hydroxyalkyl cellulose ether comprising the steps of:
   a) alkalizing cellulose to obtain alkali cellulose,
   b) reacting alkali cellulose with an alkyl halogenide until an alkyl cellulose ether with a D.S.(alkyl) value of from 0.7 to 2.5 is attained,
   c) removing excess alkyl halogenide from the reaction mixture, and
   d) reacting the alkyl cellulose ether with an alkylene oxide in a liquid suspending agent to produce an alkyl hydroxyalkyl cellulose ether, wherein the weight ratio between the alkylene oxide and the liquid suspending agent is from 0.001:1 to 1:1 and the liquid suspending agent is a blend comprising from 10 to 90 weight percent of an alcohol and from 90 to 10 weight percent of an aromatic or aliphatic hydrocarbon.

2. The process of claim 1 wherein in step b) alkali cellulose is reacted with an alkyl halogenide until an alkyl cellulose ether with a D.S.(alkyl) value of from 0.8 to 2.2 is attained.

3. The process of claim 1 wherein excess alkali metal hydroxide is removed in step c).

4. The process of claim 1 wherein in step d) the alkyl cellulose ether is reacted with the alkylene oxide until an alkyl hydroxyalkyl cellulose ether with an M.S.(hydroxyalkyl) value of from 0.03 to 2.0 is attained.

5. The process of claim 1 wherein step d) is carried out in a blend of isopropanol and n-hexane as a suspending agent.

6. The process of claim 1 wherein the alkyl halogenide in step b) is methyl chloride and the alkylene oxide in step d) is propylene oxide.

7. The process of claim 1 wherein the alkyl halogenide in step b) is methyl chloride and the alkylene oxide in step d) is ethylene oxide.

8. The process of claim 1 wherein steps b) and d) are carried out in separate reactors.

9. A process for preparing an alkyl hydroxyalkyl cellulose ether comprising the steps of:
   a) alkalizing cellulose to obtain alkali cellulose,
   b) reacting alkali cellulose with an alkyl halogenide until an alkyl cellulose ether with a D.S.(alkyl) value of from 0.7 to 2.5 is attained,
   c) removing excess alkyl halogenide and excess alkali metal hydroxide from the reaction mixture, and
   d) reacting the alkyl cellulose ether with an alkylene oxide in a liquid suspending agent to produce an alkyl hydroxyalkyl cellulose ether, wherein the liquid suspending agent is a blend comprising from 10 to 90 weight percent of an alcohol and from 90 to 10 weight percent of an aromatic or aliphatic hydrocarbon.

10. The process of claim 9 wherein the suspending agent in step d) is a blend of isonropanol and n-hexane.

* * * * *